Nov. 27, 1956     C. L. READ     2,772,210
SOLVENT DEWAXING PROCESS
Filed June 12, 1952
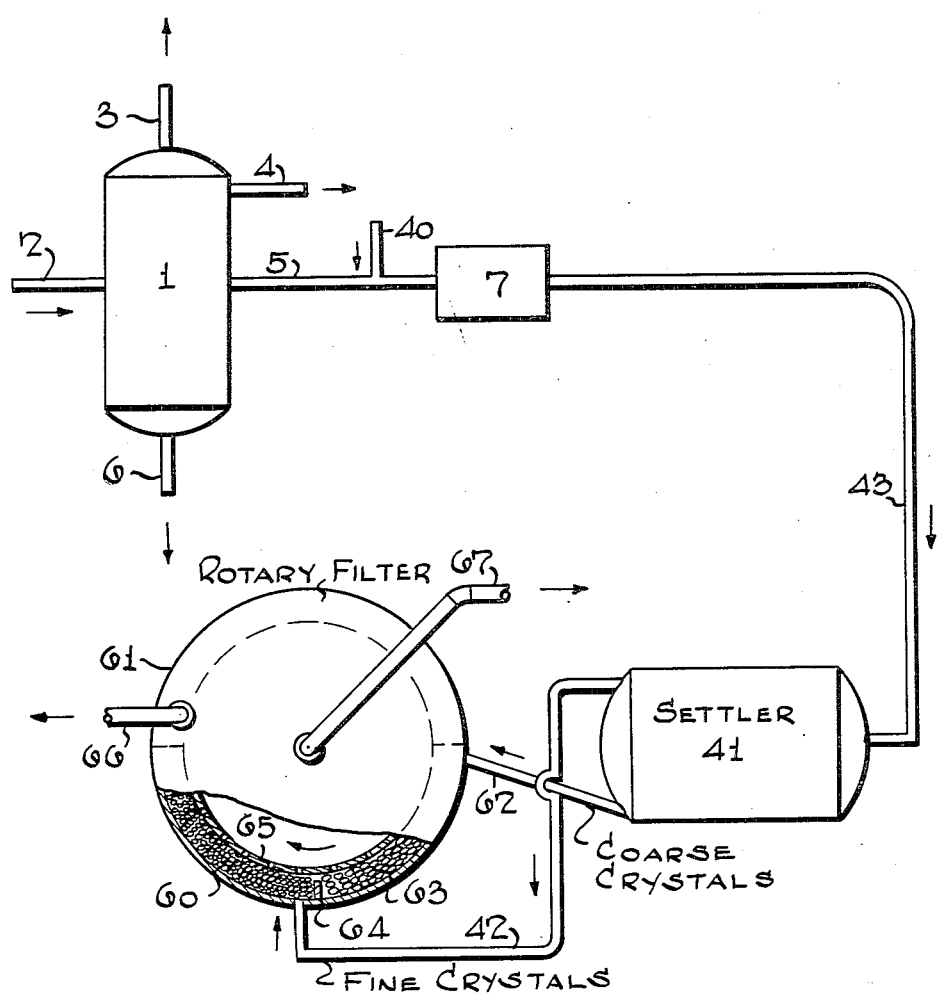
Chester L. Read     Inventor
By W. O. J. Heilman     Attorney

United States Patent Office 2,772,210
Patented Nov. 27, 1956

2,772,210

SOLVENT DEWAXING PROCESS

Chester L. Read, Westfield, N. J., assignor to Esso Research and Engineering Company, a corporation of Delaware Application June 12, 1952, Serial No. 293,183

8 Claims. (Cl. 196—19)

The present invention relates to an improved process for the removal of waxy constituents from waxy oils containing the same. The invention is more particularly concerned with the segregation of a stream comprising the finer or smaller wax crystals from a stream comprising the larger or coarser crystals. In accordance with the present invention, improved filter rates are secured by first plating the filter cloth with the larger crystals and then plating the smaller crystals on top of the larger ones. In accordance with the present invention, the chilled wax slurry is passed to a settling zone wherein a stream comprising the larger wax crystals is segregated and passed to an initial section of a filtering zone. A stream comprising the finer or smaller wax crystals is segregated in the settling zone and passed to the filtering zone at a subsequent section.

In the refining of hydrocarbon oils such as petroleum oils, it is known to segregate paraffin waxes from so-called paraffin distillates, waxy lubes and the like. The segregation of these waxes is secured by a number of processes. For example, it is known to chill the selected wax containing fraction in order to secure crystallization of the wax and to remove the wax crystals from the oil by filtering, centrifuging and the like. It is also known to use various dewaxing solvents such as liquid normally gaseous hydrocarbons, such as propane, as well as other solvents, such as methylethyl ketone and the like. It is also known to utilize in dewaxing operations solvent mixtures wherein one solvent comprises a wax precipitating solvent while the other comprises a solvent having a high solubility for oil. A solvent mixture of this character, for example, comprises 40% by volume of toluene and 60% by volume of methylethyl ketone. In utilizing a solvent mixture of this type, it has been the practice to add the mixture in toto or incrementally to the waxy distillate as it is being chilled. In dewaxing operations, it is also known to use various filter aids and other agents in order to render the dewaxing and filtering operations more efficient.

The wax segregated from the hydrocarbon oil, usually termed, "slack wax," contains from about 10% to 40% of oil. The slack wax is refined usually by conventional sweating to produce "crude scale wax" in a manner to reduce the oil content to less than about 5% by weight. The slack wax may be distilled to obtain the desired boiling range wax prior to sweating, if desired. This "crude scale wax" generally has an oil content of about 2% to 3% by weight. In order to remove this oil from the crude scale wax to produce a refined wax having an oil content below about .5%, usually below about .3%, various procedures have been proposed and employed.

It is also known in the art to segregate microcrystalline waxes from residual oils. These microcrystalline waxes are of a relatively high melting point and of different crystalline structure. The microcrystalline or petrolatum waxes may be prepared from any of the paraffin or mixed base crude oils. The undistilled residue may be treated with sulfuric acid and neutralized to remove the tarry matter and unsaturated hydrocarbons. The undistilled residue also may be deasphalted. The treated stock, containing a fairly high percentage of wax, as evidenced by a very high pour point, may be dewaxed by blending with a dewaxing solvent, such as propane, methylethyl ketone-benzol, or petroleum naphtha and chilled, and filtered or centrifuged to separate the petrolatum wax from the oil solution.

This deoiling operation produces a wax containing some oil and solvent. The wax after removal of the solvent has a melting point of from about 140° to 180° F. The wax may be again put in solution with more solvent or naphtha and chilled and filtered or recentrifuged to further reduce the oil content. The wax which separates in either of these operations is referred to as crude petrolatum wax. The wax separated in the second deoiling process after stripping to remove solvent is fairly dry and of a low oil content. This wax should not be confused with petroleum jellies which contain large amounts of oil. The crude petrolatum wax or microcrystalline wax may be again put into solution with naphtha and filtered through clay or an equivalent material in order to improve its color. The clay filtered solution is distilled to remove the naphtha, the residue being a refined microcrystalline wax having a melting point within the range of about 140° to 180° F. The source of the crude oil and the oil content of the refined microcrystalline product will affect the melting point of the final wax product. The refined petrolatum or microcrystalline wax, sometimes called amorphous wax, is of very small crystal structure.

In the operations discussed above, one limiting factor on the capacity of the entire dewaxing system is the efficiency and rapidity of removing the precipitated waxy crystals from the chilled oil. In accordance with the present invention, the chilled wax slurry is passed to a settling zone wherein a separation is made between a stream comprising the relatively coarse crystals and a stream comprising the relatively small crystals. The relatively large crystals along with oil and solvent are passed to an initial section of the filtering zone while the relatively small crystals comprising oil and solvent are passed to a second section of a filtering zone.

The present invention will be more fully appreciated by reference to the drawing illustrating one embodiment of the same. Referring specifically to the drawing, a waxy crude oil is introduced into distillation zone 1 by means of feed line 2. Temperature and pressure conditions in zone 1 are adapted to remove overhead by means of lines 3 and 4 two low boiling hydrocarbon fractions. A waxy distillate fraction is removed as a side stream by means of line 5, while a residual oil is removed by means of line 6.

The waxy distillate is mixed with solvent introduced by means of line 40 and flows through a chilling zone 7 which may comprise a plurality of chilling stages wherein the temperature of the waxy distillate is progressively reduced. A typical operation is to introduce the feed oil into an initial chilling stage at a temperature of about 130° F.; to introduce the feed oil into the second chilling stage at a temperature of about 90° F.; to introduce the feed oil to the third chilling stage at a temperature of about 60° F.; to introduce the feed oil to the fourth chilling stage at a temperature of about 25° F. and to chill the same in the fourth chilling stage to a temperature in the range from about −10 to +10° F. The operation of the respective chilling stages may be varied appreciably and either direct or indirect chilling means utilized. For purposes of illustration, it is assumed that a solvent mixture is used and that the wax-precipitant comprises methylethyl ketone and the aromatic solvent having a high solubility for oil comprises toluene. It is also assumed that about 1 to 4 volumes of total solvent mixture is utilized per volume of waxy oil being dewaxed. The solvent mixture comprises about 75% by volume of methylethyl ketone and about 25% by volume of toluene.

In accordance with the present invention at least a portion of the chilled slurry is passed to a settling or classifying zone 41 by means of line 43. The relatively coarse crystals settle toward the bottom of the zone while the relatively fine or small crystals are in the upper area of the zone. The relatively coarse crystals along with solvent and oil are withdrawn from zone 41 by means of line 62 and are passed to an initial section 63 of rotary filtering zone 61. The relatively fine crystals along with solvent and oil are removed from zone 41 by means of line 42 and passed to a secondary section 60 of rotary filtering zone 61.

Filtering zone 61 is a conventional type of rotary filter except that a baffle element 64 is disposed in the liquid area which is adapted to segregate the liquid area into two sections, that is, an initial section 63 and secondary filtering section 60. The wax cake, as the filter rotates, accumulates on the filter cloth 65. Scraper or other suitable means are adapted to remove the cake from the filter cloth by means of line 66. The solvent and oil flow through the cloth and are withdrawn from an inner point of the filter by means of line 67. The liquid stream is handled in a manner to separate the dewaxed oil from the solvent which is preferably recycled to the system. The wax cake is also processed for solvent recovery and is further refined to secure any desired wax fraction of the desired quality.

The present invention is broadly concerned with an operation wherein a rotary type filter is utilized and wherein a waxy mass containing the large crystals is filtered in an initial section of the filtering zone. A stream comprising the smaller crystals is filtered in a secondary section of the filtering zone under conditions that the smaller crystals plate out on top of the larger crystals which are adjacent the filter cloth.

The process of the present invention may be more fully understood by the following example illustrating the same.

*Example*

Various operations were conducted wherein filter rates were determined for various crystal sizes. In one operation using propane as the solvent, crystals having a size of .001" and larger were filtered. In another operation a mixture of crystals was filtered. The mixture comprised 95% crystals having .001" diameters and larger, and 5% of crystals of .001" diameters and smaller. In a third operation the mixture utilized in the second operation was used except that the larger crystals were first plated out and then smaller crystals were plated out on top of the larger crystals in accordance with the present invention. In a fourth operation crystals having .0001" diameters and smaller were filtered. The results of these operations are as follows:

| Operation | Crystal Size | Filter Rate Gals. of Dewaxed Oil Per Gal. Per Sq. Ft. Filter Surface |
|---|---|---|
| 1 | .001 and larger | 145 |
| 2 | 95% .001 and larger / 5% .0001 and smaller | 5 |
| 3 | Same as 2 except operated in accordance with 1. | 40 |
| 4 | .0001 and smaller | 1.5 |

From the above it is apparent that decidedly improved filtering rates are secured by operating in accordance with the present process.

The process of the present invention is applicable to both distillate and residual stocks, particularly where the stocks contain no natural wax crystalline modifier, such as asphalt or added synthetic modifier such as paraflow. The operation has been described with respect to the utilization of a settling zone for the segregation of the relatively smaller crystals from the relatively larger crystals. This process may be effectively used when a gravity differential of at least .05 exists between the wax and the solvent oil phases. When the gravity differential between the phases is less favorable other forms of segregating the smaller crystals from the larger crystals may be utilized, as for example, centrifuges, cyclones and the like.

Various conventional dewaxing solvents such as propane, light hydrocarbons, ketones of up to 8 carbon atoms, mixtures of ketone and aromatics, chlorinated solvents, etc. may be employed in this process. It is essential that a suitable gravity differential exist between the wax crystals and the solvent-oil solution in order to obtain a satisfactory separation of the coarse and fine crystals. This gravity differential should be at least .03 to .05 and preferably higher if settling is to be employed in effecting a separation of the crystals by size. Where a limited gravity differential exists, other separating means such as a centrifuge or a cyclone may be employed for the separation. Where the lighter solvents, such as propane, hydrocarbons, ketones and ketone-aromatic mixtures are employed, the coarser crystals settle to the bottom and the finer to the top. Where heavier dewaxing solvents, such as chlorinated products, are employed the reverse is true with the coarser crystals settling to the top. Where the lighter dewaxing solvents are employed, the coarse crystals and solvent-oil mixture may be withdrawn from or near the bottom of the settler. The finer crystals may be withdrawn near the top of the settler or as a side stream.

The quantity of solvent employed is a function in general of the amount of wax present and the solvent dilution may be of the order of 1 to 3 volumes of solvent per volume of oil. The solvent dilution should be such that the precipitated wax phase at the dewaxing temperature should amount to 2–12% of the total volume. In washing the wax cake, 1 to 3 volumes of solvent may be employed. This procedure is also applicable to deoiling in which 1 to 6 volumes of solvent may be employed and 2 to 6 additional volumes employed in the washing operation. Similar dilution may be employed in repuddling a wax cake to further reduce its oil content.

The time required to effect a separation of fine and coarse crystals by gravity separation will depend upon the gravity differential between the two phases. This time may range from 5 minutes to 2 hours, usually in the range of 5 to 20 minutes.

In filtering the coarse slurry, it is desirable to produce a wax cake .1 to .5 inch in thickness. In producing this cake, from 75° to 150° of rotation of the rotary filter may be involved. The fine crystals are deposited on this cake to a depth of .005 to .05 inch. The filtering of the fine crystals may involve rotation of the drum through an angle of 30° to 90°. In this operation the drum may be varied in speed from 20–120 revolutions per hour.

In separating the coarse and fine crystals, it is desirable that the coarse crystals contain essentially no fine particles. For this reason it is desirable to obtain a cut of fine crystals which will contain some coarse crystals. In actual operation, the quantity of total slurry segregated to contain the fine crystals may vary from 5 to 25%.

What is claimed is:

1. Improved process for removing waxy constituents from a wax-bearing oil which comprises adding a solvent to the wax-bearing oil, chilling the same to a temperature at which the waxy crystals precipitate, separating an oil phase comprising the smaller crystals and an oil phase comprising the larger crystals, passing the phase comprising the larger crystals to an initial section of a filtering zone and causing the larger crystals to plate out on the filter cloth, passing the phase containing the smaller crystals to a secondary section of the filtering zone, rotating the cloth containing the larger crystals to said secondary section and causing said smaller crystals to plate out on the larger crystals.

2. Process as defined by claim 1 in which the wax-bearing oil is chilled to a temperature in the range from about −10° F. to +10° F. prior to separating a phase comprising the smaller crystals and a phase comprising the larger crystals.

3. Process as defined by claim 1 wherein the phase comprising the smaller crystals and the phase comprising the larger crystals are segregated in a settling zone after chilling and prior to passing the respective phases to said filtering zone.

4. Process as defined by claim 1 wherein the operation is conducted in a manner to secure a specific gravity differential of at least .03 between the wax crystals and the solvent-oil solution.

5. Process as defined by claim 1 wherein the solvent comprises a mixture of toluene and a ketone.

6. Process as defined by claim 1 wherein the larger crystals are caused to plate out on the filter cloth to a thickness in the range from about 0.1 to 0.5 inch and wherein said smaller crystals are caused to plate out on said larger crystals to a thickness in the range from about 0.005 to 0.05 inch.

7. Process as defined by claim 1 wherein said phase comprising the smaller wax crystals contains a small quantity of larger crystals and wherein said phase comprising the larger wax crystals is substantially free of crystals having diameters of .0001 inch and smaller.

8. Process as defined by claim 1 wherein said phase comprising the smaller crystals is about 5 to 25% of the total wax slurry.

References Cited in the file of this patent
UNITED STATES PATENTS

| | | |
|---|---|---|
| 1,449,774 | Najarian | Mar. 27, 1923 |
| 1,737,737 | Suhr et al. | Dec. 3, 1929 |
| 2,053,872 | Montgomery | Sept. 8, 1936 |
| 2,132,355 | Knowles | Oct. 4, 1938 |
| 2,268,788 | Warner et al. | Jan. 6, 1942 |
| 2,499,412 | Peterson | Mar. 7, 1950 |
| 2,518,365 | Pattillo | Aug. 8, 1950 |
| 2,547,612 | Andersson | Apr. 3, 1951 |
| 2,608,518 | Greene | Aug. 26, 1952 |
| 2,654,692 | Kiersted et al. | Oct. 6, 1953 |